United States Patent Office 3,458,522
Patented July 29, 1969

---

3,458,522
4-PIPERIDINE SUBSTITUTED BENZOCYCLO-HEPTAOXAZOLES AND BENZOCYCLOHEP-TATHIAZOLES
Eugene E. Galantay, Morristown, N.J., assignor to Sandoz, Inc., Hanover, N.J.
No Drawing. Continuation-in-part of application Ser. No. 639,051, May 17, 1967. This application Feb. 19, 1968, Ser. No. 706,610
Int. Cl. C07d 91/42, 85/48; A61k 27/00
U.S. Cl. 260—293.4    17 Claims

ABSTRACT OF THE DISCLOSURE

The compounds are piperidylene-substituted-benzocycloheptaoxazoles, piperidylene-substituted-benzocycloheptathiazoles and piperidyl-substituted-benzocycloheptathiazoles, e.g., 2-methyl-4-(1'-methyl-4'-piperidylene)-9,10-dihydro-4H-benzo[5,6]cyclohepta[1,2-d] oxazole. The compounds are useful as pharmaceuticals, for example, as antihistamines, anti-Parkinsonian agents, tranquilizers, and anti-depressant. The compounds are obtained by reacting a 2 - lower alkyl-9,10-dihydro-4H-benzo[5,6]cyclohepta[1,2-d]oxazol-4-one or thiazol-4-one with an N-lower alkyl-4-piperidyl Grignard reagent to obtain a Grignard adduct, hydrolyzing the adduct to the corresponding carbinol, and then dehydrating the carbinol.

---

This application is a continuation-in-part of copending Ser. No. 639,051, filed May 17, 1967.

This invention relates to benzocycloheptane derivatives. In particular, the invention pertains to benzocycloheptaoxazoles and benzocycloheptathiazoles and methods for preparing the same. The invention also relates to intermediates which are useful in preparing said compounds and processes for preparing intermediates thereof.

The benzocycloheptanes of the present invention may be represented structurally as follows:

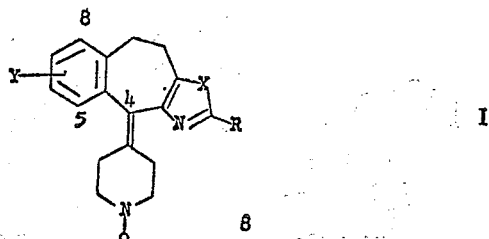

and

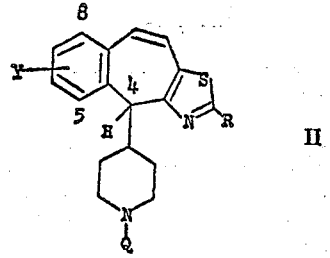

wherein

Y is a hydrogen atom or a halo having an atomic weight of 35 to 80, i.e. chloro or bromo;
R is lower alkyl, e.g., having from 1 to 4 carbon atoms, such as methyl, ethyl, propyl and butyl;
X is oxygen (—O—) or sulfur (—S—); and
Q is a hydrogen atom, lower alkyl, e.g., having from 1 to 4 carbon atoms, cyano, 2-hydroxyethyl, or acetoxyethyl (—CH—CH$_2$OCOCH$_3$).

The compounds of structural Formula I wherein Q is lower alkyl, i.e. compounds Ia, are prepared by treating a suitable tricyclic ketone (a compound III), e.g., a 2-lower alkyl-9,10 - dihydro-4H-benzo[5,6]cyclohepta[1,2-d]oxazol-4-one, with an N-lower alkyl-4-piperidyl Grignard reagent (compound IV); hydrolyzing the resultant Grignard adduct to form the corresponding carbinol (a compound V), e.g., a 2-lower alkyl-4-(1'-lower alkyl-4'-piperidyl)-9,10 - dihydro - 4H-benzo[5,6]cyclohepta[1,2-d]oxazol-4-ol; and then dehydrating the latter, as illustrated by the following reaction scheme A, wherein X, Y and R are as defined above;

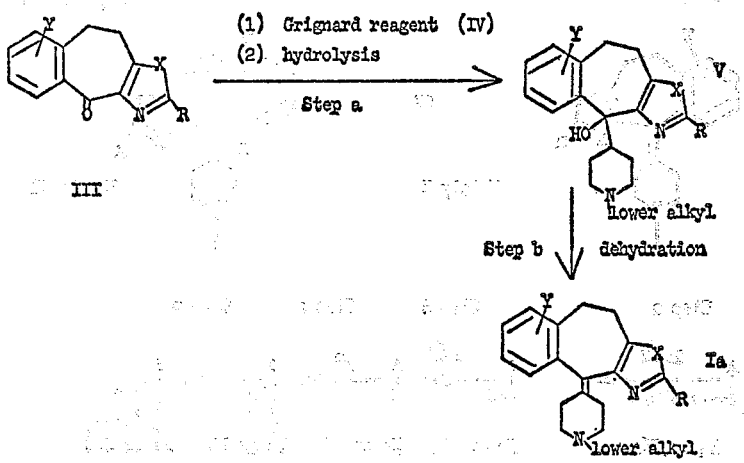

Compounds I include the classes of compounds Io (wherein X is oxygen) and Is (wherein X is sulfur) and compounds Ia include the classes of compounds Iao (wherein X is oxygen) and Ias (wherein X is sulfur).

Compounds of the structural Formula II wherein Q is lower alkyl, i.e. compounds IIa, are obtained as a co-product along with the corresponding compound Ia when reaction scheme A is carried out using a compound III wherein X is S, as illustrated below:

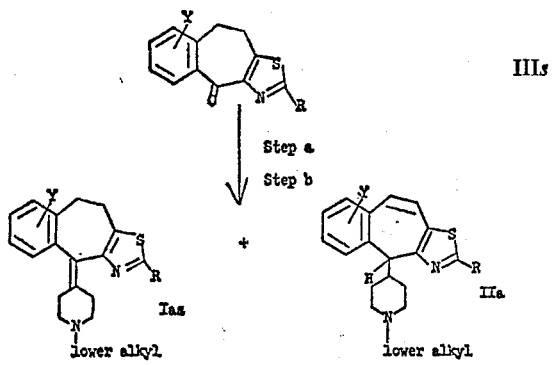

In Step a of reaction scheme A, the Grignard reagent (IV) is prepared by a conventional procedure, preferably by reacting magnesium with an N-lower alkyl p-chloro-piperidine in an appropriate solvent, e.g., dry tetrahydrofuran (THF). The condensation of the Grignard reagent with the compound III to form the corresponding Grignard adduct and subsequent hydrolysis thereof are carried out in a conventional manner, as has been previously described in the prior art for the preparation of dibenzocycloheptene type tricyclic compounds, e.g., compound III is slowly added under anhydrous conditions to a cooled (−5° to 10°) solution of the Grignard reagent, the mixture allowed to stand at room temperature for 4 to 12 hours, and then hydrolytically decomposed under practically neutral conditions, e.g., by slowly adding a saturated aqueous solution of ammonium chloride.

In Step b, dehydration of compound V to the corresponding compound Ia is accomplished by heating in strongly acidic dehydrating media, by such procedures as are described in the prior art. Preferably, the compound V is dissolved in acetic acid, hydrogen chloride is added, and then the mixture is heated with acetic anhydride under reflux conditions.

Compounds I and II wherein Q is other than lower alkyl (as defined above) are obtained from the corresponding compound Ia or IIa, respectively, according to the following reaction scheme B wherein only the reactions at the 1'-position of the piperidylene moiety or the piperidyl moiety, respectively, are shown; A representing either of the moieties (X, Y and R being as defined above):

According to reaction scheme B, in Step c a compound Ia or IIa is converted to the corresponding cyano-derivative by a von Braun cyanogen bromide reaction. Step c is carried out in a conventional manner, e.g., a solution of compound Ia or IIa in absolute benzene is added dropwise to cyanogene bromide in absolute benzene at a temperature of from 4° to 40° and the mixture maintained at such temperature for a period of time as required to obtain the corresponding compound Ib or IIb, e.g., 6 to 24 hours.

In Step d the compound Ib or IIb is converted to its corresponding compound Ic or IIc by heating with aq. mineral acid, e.g., refluxing with hydrochloric acid (5 to 10%), preferably in a solvent, e.g., glacial acetic acid.

Step e is a hydroxyethylation the compound Ic or IIc to the corresponding compound Id or IId, e.g., by dissolving the compound Ic or IIc in absolute ethanol, absorbing ethyleneoxide in the solution at 0° to 10°, and then autoclaving the mixture at 60° to 80°.

Step z is an acetylation of the compound Id or IId to the corresponding compound Ie or IIe. The acetylation can be effected by conventional means, preferably by allowing a mixture of compound Id or IId, pyridine and acetic anhydride to stand at room temperature.

The 2-lower alkyl - 9,10 - dihydro - 4H - benzo[5,6]cychlohepta[1,2-d]oxazo-4-ones or 2-lower alkyl-9,10-dihydro - 4H - benzo[5,6]cyclohepta[1,2-d]thiazol - 4 - ones used as the starting materials for the process described in reaction scheme A, i.e. compounds IIIo or IIIs depending on whether X is oxygen or sulfur, are obtained according to the following reaction scheme C, wherein Y and R are as defined above and HZ is a hydrohalic acid wherein Z is a halogen atom having an atomic weight of from 35 to 127.

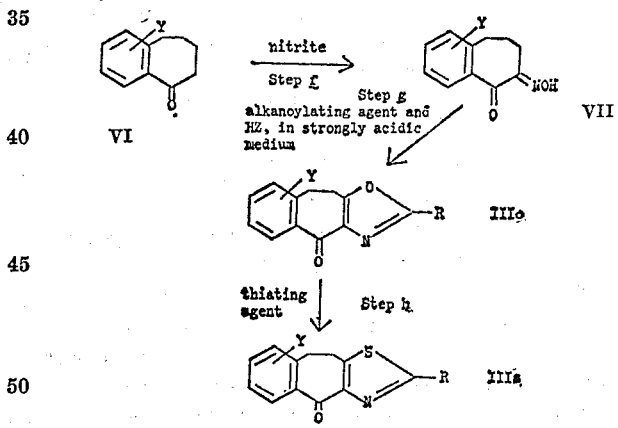

According to reaction scheme C, step f is a nitrosation of a compound VI, i.e. a 6,7,8,9-tetrahydro-5H-benzocyclohepten-5-one, to form the corresponding compound VII, i.e. a 6-isonitroso-6,7,8,9-tetrahydro-5H-benzocyclohepten-5-one.

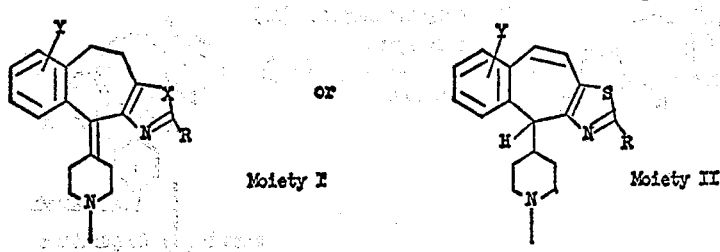

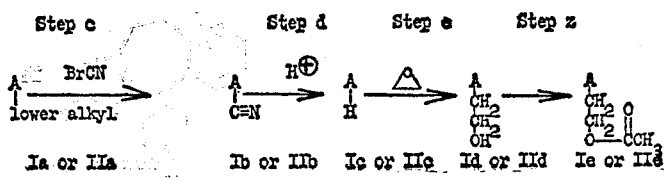

The nitrosation is conveniently effected in conventional manner employing an appropriate inert organic solvent, e.g., benzene, toluene and diethyl ether, and a nitrite, preferably a lower alkyl nitrite, e.g., ethyl nitrite and butyl nitrite. Preferably the reaction is carried out at room temperature or below and in the presence of a strong anhydrous acid or base, such as hydrochloric acid or sodium methoxide, respectively. The 6,7,8,9-tetrahydro-5H-benzocyclohepten-5-ones (compounds VI), are either known and can be prepared as described in the literature or they can be prepared from available materials in analogous manner to that described in the literature for the preparation of the known compounds.

In Step g the compound VII, i.e. the 6-isonitroso-6,7,8,9 - tetrahydro - 5H - benzocyclohepten - 5 - one is converted to the corresponding compound IIIo, i.e. the benzocycloheptaoxazol-4-onei, by treatment with an appropriate alkanoylating agent and HZ acid, in a strongly acidic medium. Suitable alkanoylating agents include the lower alkanoic acids, e.g., acetic acid, propionic acid and butyric acid, the corresponding acid anhydrides thereof, e.g., acetic anhydride, propionic anhydride and butyric anhydride, mixtures of lower alkanoic acids and their corresponding anhydrides, e.g., acetic acid and acetic anhydride, propionic acid and propionic anhydride and butyric acid and butyric anhydride, lower alkanoyl halides, e.g., acetyl chloride, propionyl chloride and butyryl chloride, and mixtures of alkanoyl halides with the corresponding alkanoic acids and/or anhydrides such as mentioned above. Preferred alkanoylating agents are those having a

moiety; R being as defined above. The alkanoylating agent should be essentially water-free.

The HZ acid employed is preferably one wherein Z is a chlorine atom, i.e. hydrogen chloride. The acid may be added directly to the reaction mixture or formed in situ, e.g., from a suitable alkanoyl halide.

With respect to Step g the reaction medium should be strongly acidic. Suitable acid should be used and in an amount so as to maintain strongly acidic conditions in the reaction mixture. Desirably, the reaction is carried out in the presence of at least 2 moles of HZ acid per mole of the isonitroso compound. Preferably from 2.5 to 3 moles of HZ acid per mole of isonitroso compound are employed. It is further desirable that the acidity of the reaction mixture is such that an aliquot portion thereof when diluted with water (1:10) given a pH reading of not higher than 2 and preferably is in the range of from 0.5 to 1.5. Such acidic conditions may be provided wholly by the HZ acid or in part supplemented by strong acid, e.g., mineral acid such as sulfuric acid. The reaction can be carried out in an inert organic solvent if desired. However, the use of a solvent is not necessary since an excess of the alkanoylating agent can be employed for this purpose. If a solvent is employed, the choice thereof is not critical and any inert organic solvent conventionally used with alkanoylating agents of the type mentioned above can be employed, e.g., toluene and dioxane. Similarly, the temperature at which the reaction is effected is not critical. The particular temperature employed is for the most part dependent on the particular reactants used. In general, it is desirable to carry out the reaction at an elevated temperature of from about 60° C. to about 150° C. Preferably, the reaction is carried out at a temperature of from 80° C. to about 110° C. The reaction is generally complete within several minutes to 3 hours depending upon the particular condition and reactants employed. In most instances, the resulting product separates as a solid, when the reaction mixture is poured over ice or diluted with water, and can be recovered by filtration and further purified by crystallization in conventional manner. When the product separates as an oil, it can be readily extracted with a suitable solvent, e.g., benzene, and further purified by conventional techniques.

In Step h, the compound IIIo, i.e. the benzocycloheptaoxazol-4-one,i is converted to the corresponding compounds IIIs, i.e. the benzocycloheptathiazol-4-one, by treatment with a sulfur containing reagent (thiating agent) capable of replacing a ring oxygen atom with a sulfur atom. Thus the process of reaction scheme C may be followed to provide either or both classes of compounds III, i.e. compounds IIIo and compounds IIIs. The preferred thiating reagents are the alkalihydrosulfides, particularly, the alkali-metal hydrosulfides, e.g., sodium hydrosulfide and potassium hydrosulfide. However, other thiating agents, such as phosphorus pentasulfide can also be used. The conversion is conveniently effected in an inert polar organic solvent, e.g., dimethylacetamide, diethylacetamide, dimethylformamide, pyridine, quinoline and sulfolane, and at 20° or elevated temperatures.

All the compounds of Formulae Ia, Ic, Id, Ie, IIa, IIc, IId and IIe are useful because they have pharmaceutical activity. In particular, they are all useful as anti-histamines as indicated by the in vitro effect on guinea pig ileum (Tyrode; Arch. Pharmacodyn, 20: 205, 1910). For such use the compounds are administered to mammals orally in daily doses of from 0.125 milligram per kilogram to 1.25 milligrams per kilogram of body weight or parenterally in daily doses of from 0.0125 milligram to 0.25 milligram per kilogram of body weight. For large mammals, the total daily oral dosage is from about 0.5 milligram to 10 milligrams per diem, preferably administered in divided doses from 2 to 4 times per diem. Dosage forms suitable for oral administration comprise from 0.125 milligram to 5 milligrams of active compound in intimate admixture with solid or liquid pharmaceutically acceptable carrier or diluent.

All of the compounds of Formulae Ia, Ic, Id, Ie, IIa, IIc, IId and IIe wherein Y is a hydrogen atom are also useful as anti-Parkinsonian agents, as indicated by the antagonism of Tremorine in white mice (Everett et al.; Science, 124: 79, 1956). For such use the compounds are administered to mammals in the same manner and in the same dosages as described above for use as anti-histamines.

All of the compounds of Formulae Ia, Ic, Id, Ie, IIa, IIc, IId and IIe wherein Y is halo, as defined above, and also useful as tranquillizers as indicated by behavioral tests in white mice (Irwin, S.: Gordon Research Conference, Medicinal Chemistry, 1959, and Chen; Symposium on Sedative and Hypnotic Drugs, Williams and Wilkins, 1954), and "rotarod" test (Dunham, N. W. and Miya, T. S.; J. Pharm. Sci., 46: 208, 1957) on white mice. For such use the compounds are administered to mammals orally in daily doses of from 1.25 milligrams to 25 milligrams per kilogram of body weight or parenterally in daily doses of from 0.25 milligram to 5 milligrams of body weight. For large mammals the total oral daily dosage is from 10 milligrams to 200 milligrams per diem, preferably in divided doses 2 to 4 times per diem. Dosage forms suitable for oral administration comprise from 2.5 milligrams to 100 milligrams of active compound in intimate admixture with solid or liquid pharmaceutically acceptable carrier or diluent.

2 - methyl-4-(1'-methyl-4'-piperidylene)-9,10-dihydro-4H-benzo[5,6]cyclohepta[1,2-d]oxazole and 2-methyl-4-(1' - acetoxyethyl - 4' - piperidylene)-9,10-dihydro-4H-benzo[5,6]cyclohepta[1,2-d]oxazole (the title compounds of Examples 1 and 6, respectively) are also particularly useful as antidepressants, as indicated by the delayed dihydroxyphenylalanine (DOPA) potentiation test on white mice (Everett and Evans; Fed. Proc. 23: 198, 1964). For such use they are administered to mammals orally in daily doses of from 0.5 milligram to 5 milligrams per kilogram of body weight or parenterally in daily doses of from 0.05 milligram to 1 milligram per kilogram of body weight. For large mammals the total oral daily dosage is from 2 to 40 milligrams per diem, preferably in divided doses 2 to 4 times per diem. Dosage form suitable for oral administration comprise from 0.5 milligram to 20 milligrams of the compound in intimate admixture with a solid or liquid pharmaceutically acceptable carrier or diluent.

For the above uses, the compounds may be combined with a pharmaceutically acceptable carrier, and such other conventional adjuvants, as may be necessary, and administered orally in such forms as tablets, capsules, elixirs, suspensions or solutions, or parenterally in such forms as injectable solutions, suspensions or emulsions. Furthermore, the compounds may be similarly administered in the form of their non-toxic pharmaceutically acceptable acid addition salts. Such salts possess the same order of activity as the free base, are readily prepared in conventional manner by reacting the base with the appropriate acid and accordingly are included within the scope of the invention. Representative of such salts are the mineral acid salts such as the hydrochloride, hydrobromide, sulfate, phosphate and the like and the organic acid salts such as the succinate, benzoate, acetate, maleate, p-toluenesulfonate, benzene-sulfonate and the like.

For example, each of the pharmaceutically active compounds of this invention may be incorporated, for oral administration, in a tablet as the sole active ingredient. A typical tablet is constituted by from 1 to 3 percent binder, e.g., tragacanth; from 3 to 10 percent disintegrating agent, e.g., corn starch; from 2 to 10 percent lubricant, e.g., talcum; from 0.25 to 1.0 percent lubricant, e.g., magnesium stearate; and average dosage of active ingredient; and q.s. 100 percent of filler, e.g., lactose; all percentages being by weight. Tablets are prepared according to standard tabletting techniques, which are well-known in the art, employing the necessary amounts of conventional granulating liquids, e.g., alcohol SD–30 and purified water. An exemplary tabletting formulation for the instant active compounds is:

|  | Parts |
| --- | --- |
| Title compound of the Example 1 | 5 |
| Tragacanth | 2 |
| Lactose | 84.5 |
| Corn starch | 5 |
| Talcum | 3 |
| Magnesium stearate | 0.5 |
| Alocohol SD–30, purified water, q.s. | |

Examples illustrative of this invention follow. Throughout this disclosure all temperatures are centigrade (room temperature is 20°) and all percents are by weight, unless specified otherwise.

EXAMPLE 1

2-methyl-4-(1'-methyl-4'-piperidylene)-9,10-dihydro-4H-benzo[5,6]cyclohepta[1,2-d]oxazole

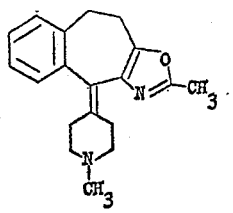

This example illustrates the preparation of a compound I, more particularly a compound Iao, according to reaction schemes A and C presented above.

(a) 6 - isonitroso - 6,7,8,9 - tetrahydro - 5H - benzocyclohepten-5-one.—To a solution of 50 g. (grams) of 6,7,8,9-tetrahydro-5H-benzocyclohepten-5-one in 210 ml. (milliliters) of 0.35 N absolute ethereal hydrochloric acid is added, over a period of 15 minutes, 32.2 g. of n-butyl nitrite while maintaining the temperature of the reaction mixture between 15° and 20° C. (by external cooling). After crystallization commences petroleum ether is added and the resulting crystalline material filtered off and washed with petroleum ether to obtain compound (a), i.e. 6-isonitroso-6,7,8,9-tetrahydro-5H-benzocyclohepten-5-one, M.P. 139° to 141° C.

(b) 2 - methyl - 9,10 - dihydro - 4H - benzo[5,6]cyclohepta[1,2-d]oxazol-4-one. — Hydrogen chloride gas is passed through a mixture of 45 ml. of glacial acetic acid and 7.8 ml. of acetic anhydride for 15 minutes while maintaining the temperature of the mixture at 100° C. Thereafter 2.997 g. of compound (a) is immediately added while continuing the passage of hydrogen chloride gas through the mixture and maintaining the reaction temperature at 100° C. during the addition of the ketone and for an additional 15 minutes thereafter. The resulting mixture is then poured over ice containing 45 g. of sodium carbonate. The resulting solids are then recovered by filtration, washed first with water and then with small amounts of ethyl acetate and then dried to obtain compound (b), i.e. 2-methyl-9,10-dihydro-4H-benzo[5,6]cyclohepta[1,2-d]oxazol-4-one, M.P. 174° to 176° C.

(c) 2 - methyl - 4 - (1' - methyl - 4' - piperidyl) - 9,10-dihydro-4H-benzo[5,6]cyclohepta[1,2-d]oxazol-4-ol

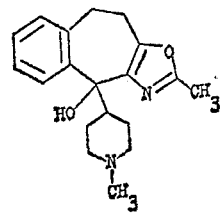

A Grignard mixture is prepared from 12.3 g. of magnesium metal, 67.5 g. of 4-chloro-N-methylpiperidine and 1500 ml. of tetrahydrofuran (THF) and 45.0 g. of compound (b) is added to the mixture at 0° over a period of 30 minutes. The reaction mixture is allowed to stand at room temperature for 8 hours, then 1.5 liters of saturated aqueous ammonium chloride are added slowly with stirring, and then extracted thrice with 500 ml. portions of diethyl ether. The extracts are dried over sodium sulfate and then evaporated to dryness under vacuum yielding a foam consisting essentially of compounds (c), i.e. 2-methyl - 4 - (1' - methyl - 4' - piperidyl) - 9,10 - dihydro-4H-benzo[5,6]cyclohepta[1,2-d]oxazol-4-ol.

(d) 2-methyl-4-(1'-methyl-4'-piperidylene) - 9,10 - dihydro - 4H - benzo[5,6]cyclohepta[1,2-d]oxazole.—The foam obtained in Step c is dissolved in 150 ml. of acetic acid and the solution saturated at 20° with hydrogen chloride, 90 ml. of acetic anhydride is then added and the solution is heated under reflux for 6 hours. The reaction mixture is then evaporated under vacuum to obtain an oily residue which is dissolved in 1 liter of water and washed thrice with 200 ml. portions of ethyl acetate to remove by-products. The aqueous phase (containing the title compound as an acid addition salt) is alkalized with 50% aqueous potassium hydroxide to pH 12 to 14 and extracted four times with 300 ml. portions of chloroform. The combined chloroform extracts are dried over sodium sulfate and evaporated under vacuum to obtain the crude title compound as oily residue. The crude title compound can be purified by vacuum distillation (boiling at over 150° at 0.075 mm. Hg pressure) and can be characterized by its NMR spectrum. (60 megaHertz, $CDCl_3$ solution):2 methyl singlets at $\delta$2.27 and 2.64 p.p.m. The acid fumarate salt has an M.P. of 198°, from ethanol-diethyl ether (1:5).

EXAMPLE 2

This example further illustrates the preparation of a compound I, and also illustrates the preparation of compounds Ias and IIa from a compound IIIs, according to reaction schemes A and C presented above. The compound Ia of this example is 2-methyl-4-(1'-methyl-4'-piperidylene)-9,10-dihydro - 4H - benzo[5,6]cyclohepta-[1,2-d]thiazole

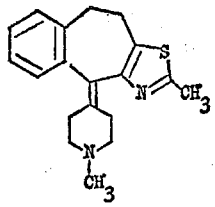

Isomer (a)

and the compound IIa is 2-methyl-4-(1'-methyl-4'-piperidyl)-4H-benzo[5,6]cyclohepta[1,2-d]thiazole

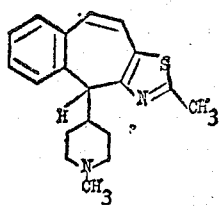

Isomer (b)

(a) 2 - methyl-9,10-dihydro-4H-benzo[5,6]cyclohepta-[1,2-d]thiazol-4-one.—Hydrogen sulfide gas is passed through a suspension of 30.0 g. of potassium tertiary butoxide in 300 ml. of dry dimethylformamide. While continuing the introduction of hydrogen sulfide gas, the resulting suspension is cooled to 5° C. and then 15 g. of 2-methyl-9,10-dihydro-4H-benzo[5,6]cyclohepta[1,2-d]oxazol-4-one (compound (b) of Example 1) is added and the resulting mixture stirred for 30 minutes at 25° C. and then poured over 400 g. of ice. The resulting mixture is then carefully acidified to pH 4 with concentrated hydrochloric acid. The acidified mixture is filtered and the filtrate extracted twice with 150 ml. (each) of benzene. The combined benzene extracts are then washed with 60 ml. of water, dried over magnesium sulfate and evaporated. The residue is added to 30 ml. of diethyl ether and the resulting solids filtered off to obtain compound (a), i.e., 2-methyl-9,10-dihydro-4H-benzo-[5,6]cyclohepta[1,2-d]thiazol-4-one, M.P. 138° to 141° C.

(b) The procedure described in parts (c) and (d) of Example 1 is repeated using compound (a) of this example, in place of compound (b) of Example 1, resulting in the recovery of a crude mixture of isomers (a) and (b) (identified above) as the oily residue. 4.28 g. of the oily residue dissolved in 50 ml. of CHCl₃ and the solution placed on a column of 260 g. of silica gel. Elution is started with chloroform. Isomer (a) is eluted with CHCl₃:MeOH (95:5). Isomer (b) is eluted with CHCl₃:MeOH (90:10). They are characterized by their NMR spectra: [1]

Isomer (a): 2 methyl singlets at δ 2.38 and 2.72 p.p.m., respectively.

Isomer (b): 2 methyl singlets at δ 2.37 and 2.85 p.p.m., respectively; 2 protons at δ 6.77 and 6.90, respectively, $J_{AB}$=11.8 c.p.s., one proton at δ 4.16, $J_{AX}$=10.0 c.p.s.

[1] 60 megaHertz, CDCl₃ solutions.

EXAMPLE 3

2-methyl-4-(1'-cyano-4'-piperidylene)-9,10-dihydro-4H-benzo[5,6]cyclohepta[1,2-d]oxazole

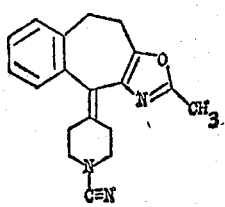

This example illustrates the preparation of a compound Ib from its corresponding compound Ia, according to the procedure of reaction scheme B, Step c, presented above.

To a solution of 7.8 g. of cyanogen bromide in 30 ml. of absolute benzene is added, dropwise at room temperature, 15.0 g. of purified 2-methyl-4-(1'-methyl-4'-piperidylene)-9,10-dihydro - 4H - benzo[5,6]cyclohepta-[1,2-d]oxazole (the title compound of Example 1) in 40 ml. of absolute benzene, the mixture allowed to stand at room temperature for 12 hours, and then evaporated under vacuum to dryness to obtain a solid residue. The solid residue is triturated with 100 ml. of diethyl ether and the ether-insoluble fraction separated by filtration. The filtrate is evaporated under vacuum to dryness yielding the title compound.

EXAMPLE 4

2-methyl-4-(4'-piperidylene)-9,10-dihydro-4H-benzo-[5,6]cyclohepta[1,2-d]oxazole

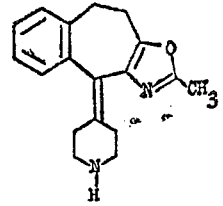

This example illustrates the preparation of a compound Ic from its corresponding compound Ib according to the procedure of reaction scheme B, Step d, presented above.

9.2 g. of unrefined 2-methyl-4-(1'-cyano-4'-piperidylene) - 9,10 - dihydro - 4H - benzo[5,6]cyclohepta[1,2-d]oxazole (obtainable according to the procedure described above in Example 3) is mixed with 22 ml. of glacial acetic acid, 22 ml. of 11 N hydrochloric acid and 146 ml. of water and the mixture heated under reflux for 4 hours. The reaction mixture is then evaporated under vacuum to obtain a residue. The residue is alkalized with 25% aqueous potassium hydroxide extracted thrice with 50 ml. portions of benzene, the extracts combined, dried over sodium sulfate and evaporated under vacuum to yield the title compound. The title compound is characterized by its NMR spectrum (60 megaHertz, CDCl₃ solution): methyl singlet at δ 2.36 p.p.m.

EXAMPLE 5

2-methyl-4-(1'-β-hydroxyethyl-4'-piperidylene)-9,10-dihydro-4H-benzo[5,6]cyclohepta[1,2-d]oxazole

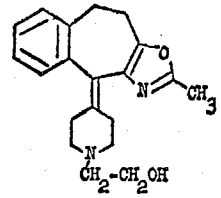

This example illustrates the preparation of a compound Id from its corresponding compound Ic, according to the procedure of reaction scheme B, Step e, presented above.

7.5 g. of unrefined 2-methyl-4-(4'-piperidylene)-9,10-dihydro - 4H - benzo[5,6]cyclohepta[1,2-d]oxazole (obtainable according to the procedure described above in Example 4) is dissolved in 90 ml. of absolute ethanol, the solution cooled to 0°, and ethylene oxide bubbled through the solution until 2.4 g. of ethylene oxide are absorbed by the solution. The solution is then placed in an autoclave and maintained under closed system conditions at 78° for 2 hours. The solution is then removed and evaporated under vacuum to yield the crude title compound as an oil. The title compound is purified by chromatographing on silica gel. The purified title compound

EXAMPLE 6

2-methyl-4-(1'-acetoxyethyl-4'-piperidylene)-9,10-dihydro-4H-benzo[5,6]cyclohepta[1,2-d]oxazole

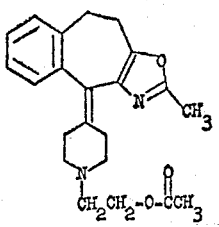

This example illustrates the preparation of a compound Ie from its corresponding compound Id, according to the procedure of reaction scheme B, Step z presented above.

One g. of 2-methyl-4-(1'-β-hydroxyethyl-4'-piperidylene)-9,10-dihydro-4H-benzo[5,6]cyclohepta[1,2-d]oxazole dissolved in 10 ml. of pyridine is admixed with 2 ml. of acetic anhydride and the mixture allowed to stand at room temperature for 16 hours. The reaction mixture is then poured on ice, and extracted thrice with 10 ml. portions of chloroform. The combined chloroform extracts are dried over sodium sulfate, filtered and evaporated under vacuum to obtain the title compound which is characterized by its NMR spectrum (60 megaHertz, CDCl$_3$ solution): 2 methyl singlets at δ 2.03 and 2.34 p.p.m.

EXAMPLE 7

6-chloro-2-methyl-4-(1'-methyl-4'-piperidylene)-9,10-dihydro-4H-benzo[5,6]cyclohepta[1,2-d]oxazole

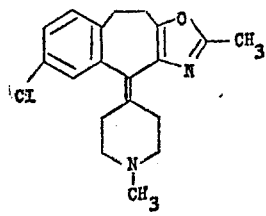

(A) Preparation of 3 - chloro - 6,7,8,9 - tetrahydro-5H-benzocyclohepten-5-one.—Into a mixture of 222 g. of 6,7,8,9 - tetrahydro - 5H - benzocyclohepten - 5 - one, 442.4 g. of anhydrous aluminum chloride and 500 ml. of 1,1,2,2,-tetrachloroethane, stirred at 25° C., there is introduced, over a period of 4 hours, 130 g. of chlorine. Then the mixture is poured onto a mixture consisting of 4 kg. of ice and 550 ml. of 11 N hydrochloric acid. The organic phase is separated and the aqueous phase is extracted thrice with 100 ml. portions of chloroform. The organic phases are combined and washed twice with 200 ml. portions of 2 N hydrochloric acid, washed thrice with 200 ml. portions of water, dried over sodium sulfate and evaporated to give an oil, which is then fractionated on a spinning band column to give the following products:

(a) 1-chloro-6,7,8,9-tetrahydro-5H-benzocyclohepten-5-one: B.P. 130–131° C./2.7 mm.; $n_D^{20}$=1.5764; oxime, M.P. 136–138° C.; and (b) 3-chloro-6,7,8,9-tetrahydro-5H-benzocyclohepten-5-one: B.P. 143–146° C./2.9 mm.; M.P. 36–40° C.; oxime, M.P. 138–142° C.

(B) Preparation of 3-chloro-6-isonitroso-6,7,8,9-tetrahydro-5H-benzocyclohepten-5-one.—Following the procedure of Step (a) of Example 1 and employing an equivalent amount of 3-chloro-6,7,8,9-tetrahydro - 5H - benzocyclohepten-5-one (obtained as described in Step A above) in place of the 6,7,8,9-tetrahydro-5H-benzocyclohepten-5-one used therein, there is obtained 3-chloro-6-isonitroso-6,7,8,9-tetrahydro-5H-benzocyclohepten-5-one; M.P. 184–186° C.

(C) Preparation of 6-chloro-2-methyl-9,10 - dihydro-4H-benzo[5,6]cyclohepta[1,2-d]oxazol-4-one. — Following the procedure of Step (b) of Example 1 and employing an equivalent amount of 3-chloro-6 - isonitroso - 6,7,8,9-tetrahydro-5H-benzocyclohepten-5-one in place of the 6-isonitroso-6,7,8,9-tetrahydro-5H-benzocyclohepten-5 - one used therein, there is obtained 6-chloro-2-methyl-9,10-dihydro-4H-benzo[5,6]cyclohepta[1,2-d]oxazol - 4 - one; M.P. 198–199° C.

(D) Preparation of 6-chloro-2-methyl-4-(1'-methyl-4'-piperidyl)-9,10-dihydro - 4H - benzo[5,6]cyclohepta[1,2-d]oxazol-4-ol.—Following the procedure of Step (c) of Example 1 and employing an equivalent amount of 6-chloro-2-methyl-9,10-dihydro-4H - benzo[5,6]cyclohepta[1,2-d]oxazol-4-one in place of the 2-methyl-9,10-dihydro-4H-benzo[5,6]cyclohepta[1,2-d]oxazol-4-one used therein, there is obtained crude 6-chloro-2-methyl-4-(1'-methyl-4'-piperidyl - 9,10 - dihydro - 4H - benzo[5,6]cyclohepta[1,2-d]oxazol-4-ol, which is used, without further purification in Step E.

(E) Preparation of 6-chloro-2-methyl-4-(1'-methyl-4'-piperidylene)-9,10-dihydro - 4H - benzo[5,6]cyclohepta-[1,2-d]oxazone.—Following the procedure of Step (d) of Example 1 and employing an equivalent amount of 6-chloro-2-methyl-4-(1'-methyl-4'-piperidyl)-9,10 - dihydro-4H-benzo[5,6]cyclohepta[1,2-d]oxazol-4-ol in place of the 2-methyl - 4 - (1' - methyl - 4' - piperidyl) - 9,10-dihydro-4H-benzo[5,6]cyclohepta[1,2 - d]oxazol - 4 - ol used therein, there is obtained 6-chloro-2-methyl-4-(1'-methyl-4'-piperidylene)-9,10 - dihydro - 4H - benzo[5,6]cyclohepta[1,2-d]oxazole.

The acid fumaric salt of the title compound is prepared in the conventional manner and has a melting point of (219°)–220°–222° C.

What is claimed is:

1. A compound selected from the group consisting of a compound of the formula

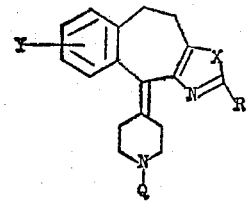

and a pharmaceutically acceptable acid addition salt thereof, wherein

Y is a member selected from the group consisting of a hydrogen atom and halo having an atomic weight of 35 to 80;

R is lower alkyl;

X is a member selected from the group consisting of oxygen and sulfur; and

Q is a member selected from the group consisting of a hydrogen atom, lower alkyl, 2-hydroxyethyl, and acetoxyethyl.

2. A compound according to claim 1 wherein X is oxygen.

3. The compound according to claim 2 which is 2-methyl-4-(1'-methyl-4'-piperidylene)-9,10 - dihydro - 4H-benzo[5,6]cyclohepta[1,2-d]oxazole.

4. The compound according to claim 17 which is 2-methyl-4-(1'-cyano - 4' - piperidylene) - 9,10 - dihydro-4H-benzo[5,6]cyclohepta[1,2-d]oxazole.

5. The compound according to claim 2 which is 2-methyl-4-(4'-piperidylene - 9,10 - dihydro - 4H - benzo-[5,6]cyclohepta[1,2-d]oxazole.

6. The compound according to claim 2 which is 2-methyl - 4 - (1' - β - hydroxyethyl - 4' - piperidylene)-9,10-dihydro-4H-benzo[5,6]cyclohepta[1,2-d]oxazole.

7. The compound according to claim 2 which is 2-methyl-4-(1'-acetoxyethyl-4'-piperidylene)-9,10 - dihydro-4H-benzo[5,6]cyclohepta[1,2-d]oxazole.

8. The compound of claim 2 which is 6-chloro-2-methyl-4-(1'-methyl-4'-piperidylene)-9,10-dihydro - 4H-benzo[5,6]cyclohepta[1,2-d]oxazole.

9. A compound according to claim 1 wherein X is sulfur.

10. The compound according to claim 9 which is 2-methyl-4-(1' - methyl - 4' - piperidylene - 9,10 - dihydro-4H-benzo[5,6]cyclohepta[1,2-d]thiazole.

11. A compound selected from the group consisting of a compound of the formula

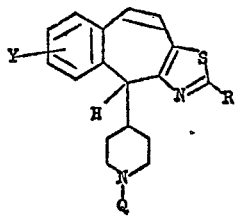

and a pharmaceutically acceptable acid addition salt thereof, wherein
Y is a member selected from the group consisting of a hydrogen atom and a halo having an atomic weight of 35 to 80;
R is lower alkyl; and
Q is a member selected from the group consisting of a hydrogen atom, lower alkyl, 2-hydroxyethyl and acetoxyethyl.

12. The compound according to claim 11 which is 2-methyl-4-(1'-methyl - 4' - piperidyl) - 4H - benzo[5,6] cyclohepta[1,2-d]thiazole.

13. A compound of the formula:

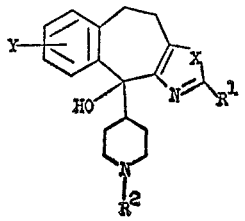

wherein
X is a member selected from the group consisting of oxygen and sulfur;
Y is a member selected from the group consisting of a hydrogen atom and halo having an atomic weight of 35 to 80; and
each of $R^1$ and $R^2$ is, independently, lower alkyl.

14. The compound according to claim 13 which is 2-methyl-4-(1'-methyl - 4' - piperidyl) - 9,10 - dihydro-4H-benzo[5,6]cyclohepta[1,2-d]oxazol-4-ol.

15. The compound of claim 13 which is 6-chloro-2-methyl-4-(1'-methyl - 4' - piperidyl) - 9,10 - dihydro - 4H-benzo[5,6]cyclohepta[1,2-d]oxazol-4-ol.

16. A compound of the formula

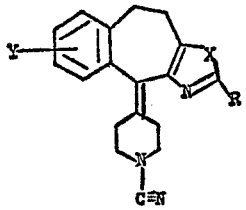

wherein
Y is a member selected from the group consisting of a hydrogen atom and halo having an atomic weight of 35 to 80;
R is lower alkyl; and
X is a member selected from the group consisting of oxygen and sulfur.

17. A compound of the formula

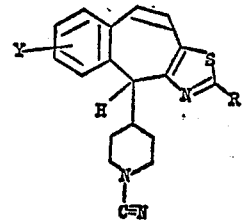

wherein
Y is a member selected from the group consisting of a hydrogen atom and a halo having an atomic weight of 35 to 80; and
R is lower alkyl.

References Cited

UNITED STATES PATENTS

| | | | |
|---|---|---|---|
| 3,014,911 | 12/1961 | Engelhardt | 260—293.44 |
| 3,326,924 | 6/1967 | Villani. | |
| 3,272,826 | 9/1966 | Jucker et al. | 260—293.44 |

HENRY R. JILES, Primary Examiner

S. D. WINTERS, Assistant Examiner

U.S. Cl. X.R.

260—294.3, 294.7, 302, 307; 424—267